Patented Oct. 31, 1944

2,361,477

UNITED STATES PATENT OFFICE 2,361,477

COSMETIC OR PHARMACEUTICAL PRODUCT

William B. Humes, Boston, Mass., assignor to National Research Corporation, Boston, Mass., a corporation of Massachusetts No Drawing. Application April 9, 1942,
Serial No. 438,279

4 Claims. (Cl. 167—91)

This invention concerns the preparation of creams, ointments, pomades and salves and more particularly means for promoting the incorporation by emulsification of water into the body of said cream, ointment, pomade or salve without undue reduction of the viscosity of said body or other undesirable change of consistency.

Creams, ointments, pomades and salves for cosmetic or pharmaceutical purposes usually consist chiefly of an emulsion of an oily substance and water. This emulsion is usually one of the water-in-oil type, although oil-in-water emulsions are sometimes used. It is desirable that a substantial quantity of water should be emulsified with the oil and it is also desirable that the emulsion should have a relatively high viscosity. In order to accomplish these purposes as far as possible, it is customary to employ in the preparation of creams, ointments, pomades and salves an amount of an emulsifying agent of high molecular weight, usually beeswax.

The beeswax used is ordinarily subjected to a bleaching treatment before incorporation into a cream, ointment, pomade or salve. After a preliminary refining by melting in the presence of water and separating from the water, the beeswax is bleached by one of a number of methods. Some of the methods used are (a) exposure to sunlight, (b) treatment with a hot dilute acid such as sulfuric acid, (c) treatment with an oxidizing agent such as hydrogen peroxide and (d) treatment with an adsorbing agent such as fuller's earth or charcoal.

I have discovered a new cosmetic or pharmaceutical product which includes means for promoting the emulsification of water with the oily constituents of creams, ointments, pomades and salves and for increasing the viscosity of creams, ointments, pomades and salves. My invention makes possible the retention of much greater amounts of water in the cream, ointment, pomade or salve than has heretofore been possible, without any sacrifice in the viscosity of the product.

Although the water-retention and viscosity-promoting ingredient of my improved preparation is derived from beeswax, it differs materially in its properties from natural beeswax and also from bleached beeswax. This ingredient is obtained by subjecting beeswax to distillation at extremely low pressures, within the range of 1.0 to .001 mm. of mercury (pressure of non-condensible gases). In this range of pressures beeswax can be distilled without decomposition. I prefer to perform the distillation at pressures between .001 and .1 mm.

The well-known low pressure types of distilling apparatus may be used. The exact temperature range at which the desired fraction is collected depends upon the pressure at which the distillation is carried out. The desired fraction is in general the first fraction collected. The following examples illustrate specific operating conditions under which this ingredient of my improved product may be collected.

The beeswax used in these examples is unbleached natural beeswax which has been subjected to a preliminary refining by removal of the honey, heating with water and decantation.

*Example I.*—The apparatus is operated at a pressure of 0.01 mm. of mercury and the collecting (condensing) surface is kept at a temperature of about 95° C. The evaporating surface is kept within the temperature range of 200° to 230° C. and a film of melted natural beeswax is maintained thereon.

*Example II.*—The apparatus is operated at a pressure of 0.1 mm. and the collecting (condensing) surface is kept at a temperature of about 95° C. The evaporating surface is slowly raised from 180° to 240° C. while a film of melted beeswax is maintained thereon.

The material condensed on the collecting surface under the above conditions is the desired material. This material differs from all heretofore known beeswaxes or beeswax preparations in its physical and chemical properties. Table I shows a comparison of the properties of the new material with beeswax.

Table I

| | Beeswax [1] | Bleached white beeswax, U. S. P. | Isolated fraction |
|---|---|---|---|
| | °C. | °C. | °C. |
| Melting point | 63-70 | 62-65 | 55-65 |
| Acid No | 16-21 | 17-23 | 40-65 |
| Ester No | 67-81 | 72-79 | Less than 30 |
| Saponification No | 83-97 | | |
| Iodine No | | 8-11 | 5-10 |

[1] Average characteristics from Hilditch, Bailliere, Tindall & Cox, The Industrial Chemistry of Fats and Waxes (London, 1925) 131 (ester number equals saponification number minus acid number). Beeswax as obtained in different parts of the world varies somewhat in characteristics.

Although the quantities above listed represent the properties generally exhibited by isolated fractions prepared as herein indicated, minor variations are possible by alterations of temperature and pressure conditions, source of material, etc. It is possible to produce isolated fractions that will realize the advantages of this invention to some substantial degree but having slightly lower acid number and somewhat higher ester number. In general, I may say that I have considered it practical to use, for the purpose of realizing the advantages of this invention, any fraction prepared in the general manner described above which may have an acid number higher than 35 and an ester number lower than 35.

The fraction isolated for use in this invention is white in color and is practically odorless, unlike ordinary beeswax, which even in the bleached condition possesses a disagreeable odor. This advantage is of great importance for the preparation of cosmetics.

One of the most outstanding of the properties of the isolated fraction prepared for use in this invention is the ability of the material to promote the retention of emulsified water in creams, ointments, pomades and salves in which the material is incorporated. In order to take advantage of this property, a base such as triethanolamine or borax should be added in order to transform the acid content of the waxy material into soaps. The following table illustrates this property of the isolated wax fraction by comparing representative water emulsions of equal viscosity prepared respectively with beeswax and with the isolated wax fraction of this invention. The greater water content of the latter emulsion is to be noted.

Table II

| Number 1 | Number 2 |
|---|---|
| U. S. P. beeswax....grams.. 77.0 | Wax fraction of Ex. 1 grams.. 77.0 |
| Triethanolamine....do.... 3.2 | Triethanolamine....do.... 3.2 |
| Stearic acid.........do.... 9.0 | Stearic acid.........do.... 9.0 |
| Water..................cc.. 250 | Water..................cc.. 500 |

A similar comparison holds between creams prepared with borax instead of triethanolamine.

The above compositions are simple water emulsions mentioned for purposes of illustration. In the preparation of pharmaceutical and cosmetic creams, and the like, it is desirable and customary to include an oily material.

The application of the beeswax fraction to the preparation of such creams and the advantages derived thereby are illustrated in Table III, in which are given the composition of two creams of equal viscosity and texture, the first made with U. S. P. beeswax and the second made according to this invention with the isolated wax fraction described above. The greater proportion of inexpensive fluid constituents in the latter composition is to be noted:

Table III

| Number 1 | | Number 2 | |
|---|---|---|---|
| | Grams | | Grams |
| U. S. P. beeswax | 15 | Wax fraction of Ex. 1 | 15 |
| Mineral oil | 25 | Mineral oil | 50 |
| Water | 30 | Water | 40 |
| Borax | 1 | Borax | 1-3 |

Various other types of creams may also be prepared deriving similar advantages from the incorporation therein of isolated wax fractions such as those here described, as will be readily apparent. If desired, instead of increasing the water content of a cream by the use of such an isolated wax fraction, a great reduction of the wax fraction content of the cream relative to the amount of beeswax commonly used in creams can be effected without reducing the water content of the cream beyond that commonly obtained in present practice. High viscosity creams can also be prepared.

The incorporation of water into a cream is desirable not only for reasons of economy and covering power, but also in many cases for reasons involving the very purpose of the cream. For instance, in the so-called "brushless" shaving preparations, the cream functions to soften hair by bringing emulsified water into intimate contact with the hair.

By means of this invention it is practical to prepare cosmetic and pharmaceutical creams of entirely acceptable viscosity and texture which contain 50 per cent or more, by weight, of water, or which contain 75 per cent or more, by weight, of constituents which themselves alone would be liquid at normal temperature. Creams of such composition have heretofore been difficult to prepare, and if it was possible at all to do so, it has not been practical, because, under the practice heretofore employed, so much beeswax would have to be used as to raise the cost of the product well beyond its market value.

I claim:

1. A cosmetic or pharmaceutical product comprising an oily substance, water, and, as a water-retention promoting ingredient, the isolated beeswax distillate which has an acid number greater than 35, an ester number less than 35 and a water retentivity greater than that of ordinary beeswax.

2. A cosmetic or pharmaceutical product comprising a mixture of an oily substance, a liquid, and the distilled beeswax fraction which has an acid number greater than 35, an ester number less than 35 and a water retentivity greater than that of ordinary beeswax.

3. A cosmetic or pharmaceutical product comprising an oily substance, at least 50% by weight of water and, as a water-retention and viscosity promoting ingredient, the isolated beeswax distillate which has an acid number greater than 35, an ester number less than 35 and a water retentivity greater than that of ordinary beeswax.

4. A cosmetic or pharmaceutical product containing an oily substance, at least 75% by weight of ingredients liquid at normal room temperature and a quantity of the isolated beeswax distillate which has an acid number greater than 35, an ester number less than 35 and a water retentivity greater than that of ordinary beeswax.

WILLIAM B. HUMES.

CERTIFICATE OF CORRECTION.

Patent No. 2,361,477.   October 31, 1944.

WILLIAM B. HUMES.

It is hereby certified that error appears in the printed specification of the above numbered patent requiring correction as follows: Page 1, second column, line 41, Table I, for " °C.   "    " °C.   "     " °C.   "
63-70 ,   62-65   and   55-65 read --63-70 °C.--, --62-65 °C.-- and --55-65 °C.-- respectively; and that the said Letters Patent should be read with this correction therein that the same may conform to the record of the case in the Patent Office.

Signed and sealed this 17th day of April, A. D. 1945.

(Seal)

Leslie Frazer
Acting Commissioner of Patents.